United States Patent
Beisele

(10) Patent No.: US 8,436,079 B2
(45) Date of Patent: May 7, 2013

(54) WEATHER-RESISTANT EPOXY RESIN SYSTEM

(75) Inventor: Christian Beisele, Auggen (DE)

(73) Assignee: Huntsman International LLC, The Woodlands, TX (US)

( * ) Notice: Subject to any disclaimer, the term of this patent is extended or adjusted under 35 U.S.C. 154(b) by 455 days.

(21) Appl. No.: 12/094,422

(22) PCT Filed: Oct. 26, 2006

(86) PCT No.: PCT/EP2006/067828
§ 371 (c)(1),
(2), (4) Date: May 21, 2008

(87) PCT Pub. No.: WO2007/060077
PCT Pub. Date: May 31, 2007

(65) Prior Publication Data
US 2009/0023843 A1 Jan. 22, 2009

(30) Foreign Application Priority Data
Nov. 22, 2005 (EP) .................................... 05111098

(51) Int. Cl.
| C08G 59/34 | (2006.01) |
| C08G 59/18 | (2006.01) |
| C08G 59/20 | (2006.01) |
| C08L 63/00 | (2006.01) |
| B32B 27/18 | (2006.01) |
| B32B 27/38 | (2006.01) |
| B32B 33/00 | (2006.01) |

(52) U.S. Cl.
USPC ............................ 523/461; 428/413; 523/400

(58) Field of Classification Search .................. 523/400, 523/461; 428/413
See application file for complete search history.

(56) References Cited

U.S. PATENT DOCUMENTS

| 4,033,928 | A | | 7/1977 | Randell et al. |
| 4,336,167 | A | * | 6/1982 | Reeh et al. .................... 523/451 |
| 4,419,472 | A | * | 12/1983 | Berner et al. ................. 524/102 |
| 5,026,751 | A | | 6/1991 | Bopp et al. |
| 5,034,493 | A | * | 7/1991 | Tani et al. ........................ 528/92 |
| 5,124,378 | A | * | 6/1992 | Behrens et al. ................. 524/95 |
| 6,638,567 | B1 | * | 10/2003 | Beisele .......................... 427/116 |
| 2003/0144414 | A1 | | 7/2003 | Bogner et al. |

FOREIGN PATENT DOCUMENTS

| JP | 01272657 A | * 10/1989 |
| JP | 02170820 A | * 7/1990 |
| JP | 08311284 A | * 11/1996 |
| JP | 2002167545 A | * 6/2002 |
| JP | 2004315744 A | * 11/2004 |

OTHER PUBLICATIONS

Registry Data for Tinuvin 123, provided by STN (no date).*
Abstract of JP 01-272657 A, provided by the JPO website.*
Abstract of JP 02-170820 A, provided by the JPO website.*
Machine Translation of JP 08-311284, provided by the JPO website.*
Machine Translation of JP 2002-167545, provided by the JPO website.*
Machine Translation of JP 2004-315744, provided by the JPO website.*

* cited by examiner

Primary Examiner — Michael J Feely

(57) ABSTRACT

A curable epoxy resin composition of an epoxy resin (a) and a combination (b) of an antioxidant (b1) and a UV absorber (b2). The UV absorber (b2) is a benzotriazole. The antioxidant (b1) is a compound of general formula I:

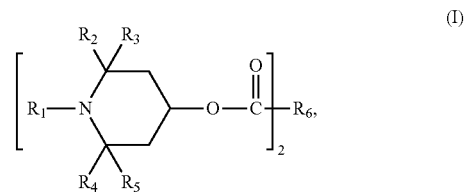

wherein: $R_1$=—H, —OH, —O—$C_{1-18}$ alkyl, —$C_{1-18}$ alkyl, —$C_{5-12}$ cycloalkyl being unsubstituted or being substituted with $C_{1-6}$ alkyl or $C_{1-6}$ alkoxy, or —$CH_2$—$C_{5-12}$ cycloalkyl being unsubstituted or being substituted with $C_{1-6}$ alkyl or $C_{1-6}$ alkoxy; $R_{2,3,4,5}$=independent from each other —$C_{1-6}$ alkyl; and R6=a bivalent aliphatic, cycloaliphatic or aromatic residue. The weight ratio of (a) to (b) is from 90.0:10.0 to 98.5:1.5, with the proviso that the weight portion of (b1) is at least 0.5. The cured product has very good weather resistance after curing by polyaddition with a polycarboxylic acid anhydride or by homopolymerization. The cured product is suitable as an electrical insulation material.

9 Claims, No Drawings

WEATHER-RESISTANT EPOXY RESIN SYSTEM

CROSS REFERENCE TO RELATED APPLICATIONS

This application is the National Phase of International Application PCT/EP2006/067828 filed Oct. 26, 2006 which designated the U.S and which claims priority to European Patent Application No. 05111098.9 filed Nov. 22, 2005. The noted application is incorporated herein by reference.

The present invention relates to a composition containing a cycloaliphatic epoxy resin, a specific antioxidant and optionally an UV-absorber, cross-linked products obtainable by curing of such a composition as well as the use of such composition as cast resin for the preparation of electrical insulation material.

Due to many advantages (costs, mechanic stability, easy producibility, low number of boundary surfaces, resistance to bird predation, variety of design, resistance to vandalism, low weight, resistance to heat shock, resistance to arc, low maintenance effort) open-air isolators are made from cast resins. Also, as a protection against chemical and climatic atmospheric influences as well as physical or mechanical influences, electrical components (e.g. the coils of current or voltage transformers or the vacuum chambers of contactors) are cast with cast resins for open-air applications. Often epoxy resins are used as cast resins due to their good mechanical properties and their high specific resistance as electrical insulation material. Particularly, cycloaliphatic epoxy resins are suitable for open-air applications due to their high weather resistance. Thereby, however, in regions with high rainfall and high air pollution the problem arise that on the surface of the isolators a conductive soil-water-layer may be built, which may lead to leakage currents and electrical arcs and as a consequence may result in damage of the isolator by formation of tracking to the point of total breakdown. Also, it may occur an increase in the conductivity of the surface with low-soiled epoxy resin base isolators, if the surface erodes in the course of time by weathering and the water may better wet such an abraded layer.

Weathering leads to a degradation of the polymeric material which manifests e.g. in yellowing, an increase in roughness, tearing, embrittlement, crawling, loss of weight, decrease of the electrical properties such as decrease of surface resistance or stability of tracking. Besides ambient temperature, moisture, oxygen, air pollutants (e.g. ozone, acids from sulfur or nitrogen oxides) UV-light also contributes to the degradation as each polymeric material is sensitive at one (or several) wave lengths in the UV region.

The possibilities to counteract polymeric degradation by photo-oxidative ageing caused by light energy (UV-light) exist in the use of screening agents. Of importance are UV absorber (UVA) absorbing the harmful light energy and transforming it into heat. Of less importance are so called quenchers for quenching excited molecular states.

The possibility to face the results of the reaction of organic molecules with molecular oxygen, namely the auto-catalysis by radical (chain) reaction (autooxidation), persists by additives removing free radicals out of the system. Those interfere with the radical chain mechanism of the autooxidation and cause an interruption of the reaction cascade.

Antioxidants (AO) or heat stabilizers protect as proton donors and scavengers in the preparation and use of plastics against harmful influences of oxygen and heat. Substantially, sterically hindered phenols, sterically hindered amines and sterically hindered non-aromatic amines (also referred to as "HALS" for "hindered amine light stabilizer") as well as benzofurane derivatives are used as primary antioxidants or scavengers. Compounds are referred to as secondary antioxidants capable of reducing alcohols to hydroperoxides and thus withdraw them from the autooxidation process. If in the following reference is made to antioxidants, primary antioxidants and in particular HALS compounds are meant. As also the mechanisms of action of UV absorbers, quenchers and antioxidants overlap, likewise UV absorbers and antioxidants are addressed by the term "UV stabilizing" or "light stabilizing".

Factors playing a role in the choice of an additive, e.g. of an antioxidant or an UV absorber, for a particular application besides its protection effect are among others the physical form (solid/liquid/melting point), particle size, thermal stability, possible interaction with other additives, toxicity (food packaging), volatility, and in particular compatibility with the respective polymer.

The behaviour of the additive with respect to the migration after incorporation into the polymer is affected by the solubility and diffusion rate, substantially. The distribution of the additive is primarily a consequence of the thermal movement of the polymer chains above the glass softening temperature and the formation and the disappearance of cavities.

Whereas such aspects specifically with respect to additives for the UV stabilization within the different thermoplastics are relatively well analyzed, there is less known in the filed of thermosetting materials like epoxy resins.

To some extent U.S. Pat. No. 5,026,751 connects both types of polymers, i.e. thermoplastics and thermosetting materials, producing the UV stability of a thermoplastic produced in the form of polyphenylene ether resins with a combination of a cycloaliphatic epoxy resin having, however, glycidyl groups, a 2-hydroxy substituted benzophenone (AO) and a polyalkyl substituted piperidine (HALS). However, it is understood that by UV stability only the stability of the colour of the so modified polymers and only for the period of at most 80 days is meant.

In EP-A-0 507 333 curable UV stabilized epoxy resin compositions are disclosed. While the epoxy resins may be chosen from aliphatic, cycloaliphatic or aromatic resins, specifically UV stabilizers are chosen having terminal hydrazide groups as functional groups. Thus, the UV stabilizer may be cross-linked with the epoxy groups of the resin using the hydrazide groups. In practice, only one part of the epoxy groups is cross-linked that way and thus the UV stabilizer incorporated into the network. Subsequently, the remaining epoxy groups are cross-linked using a conventional epoxy curing agent. According to the same principle, UV absorbers in the form of benzotriazoles functionalized by hydrazide groups may be incorporated into the epoxy network, optionally. According to the comparative tests, cured epoxy resins (Epon® 828, a liquid aromatic diglycidylether based on bisphenol-A, Tactix® 123, also a resin based on bisphenol-A with very low viscosity), having UV stabilizers incorporated into the network in such a way, have a better weather resistance vis-à-vis comparable amounts of UV stabilizers which are unable to build networks with the epoxy resin. Due to the reactivity of the hydrazide groups, respective mixtures with epoxy resins are not resistant to storage (e.g. increase of viscosity).

U.S. Pat. No. 4,033,928 discloses epoxy resins being light stabilized having sterically hindered cyclic amines (HALS). Thus, comprised are both all possible epoxy resins and cyclic amines. However, this patent does not disclose any composition for the preparation of open-air isolators.

US 2003/0144414 A1 discloses epoxy resin systems for cast resin applications which are resistant to ageing and resistant to storage, joint sealing compounds and in particular capsule masses for optoelectrical components like LED's. Amine oxide compounds of the general formula $(R_1)(R_2)N-O-R_3$ are used as stabilizers, wherein $R_1$ and $R_2$ are alkyl-, aryl- or alkylaryl groups or may built together with the nitrogen atom rings which are not further specified and $R_3$ is alkyl-, aryl-, alkylaryl- or cycloalkyl groups. Additionally, UV absorbers may be present. According to the examples, an improved ageing resistance with respect to the exposure to energy-rich electromagnetic radiation is observed by the use of an addition of 0.1 wt % of said amine oxide component which is based on the epoxy resin. However, the exact test conditions or detailed results are not given.

Finally, in EP-A1 1 454 956 curable epoxy resin compositions with—in the cured state—good weather resistance are described containing a non-aromatic epoxy resin with a cycloalkane or cycloalkene ring and which has no nitrogen atom, a carboxylic acid anhydride as curing agent, if necessary an accelerator and an UV absorber being present in an amount of 0.01 to 1.0 wt % based on the weight of resin and curing agent. As possible educt of these compositions components are explicitly excluded, which either have aromatic rings (UV absorption) or nitrogen atoms (because of their increased oxidizability). Thus, these compositions have no sterically hindered amines (HALS) as UV stabilizers besides the UV absorbents. According to the mentioned comparative example 2, the addition of a HALS compound (1,2,2,6,6-pentamethyl-4-piperidyl-tridecyl-1,2,3,4-butantetra-carboxylate) leads to a decreased weather resistance of the cured resin components than for the same resin in absence of the HALS compound.

Specifically in view of electric cast resins for isolators, however, the aforementioned systems are insufficient.

It now has been found that curable compositions containing a cycloaliphatic epoxy resin, a specific antioxidant and optional an UV absorber result under certain conditions in cast resin being resistant to storage, which are especially suitable for the preparation of electric insulation parts.

Thus, object of the present invention is a curable epoxy resin composition comprising
(a) a cycloaliphatic diglycidyl compound as epoxy resin, and
(b) an antioxidant (b1) alone or a combination of an antioxidant (b1) and an UV absorber (b2), characterized in that the antioxidant is a compound of the general formula I

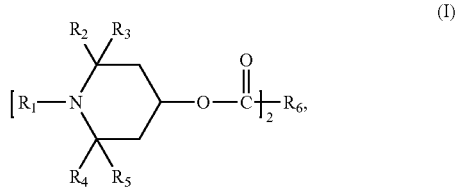

(I)

wherein $R_1 = -H$, $-OH$, $-O-C_1-C_{18}$-alkyl, $-C_1-C_{18}$-alkyl, $-C_5-C_{12}$-cycloalkyl being unsubstituted or being substituted with $C_1-C_6$-alkyl or $C_1-C_6$-alkoxy, or $-CH_2-C_5-C_{12}$-cycloalkyl being unsubstituted or being substituted with $C_1-C_6$-alkyl or $C_1-C_6$-alkoxy;
$R_{2,3,4,5}$=independent from each other $-C_1-C_8$-alkyl; and
$R_6$=a bivalent aliphatic, cycloaliphatic or aromatic residue, and
wherein the weight ratio between the components (a) and (b) is from 90.0:10.0 to 98.5:1.5,
with the proviso that the weight portion of the component (b1) is at least 0.5.

Preferred epoxy resin compositions contain components (a) and (b) in a weight ratio of from 95.0:5.0 to 98.5:1.5, in particular in a weight ratio of from 97.0:3.0 to 98.5:1.5, and with the proviso that the weight portion of the component (b1) is at least 0.5.

As component (a) of the inventive compositions all types of epoxies having at least one glycidyl- or β-methylglycidyl group, a linear alkylene oxide group or a cycloalkylene oxide group are suitable.

Examples of suitable epoxy resins are polyglycidyl and poly-(β-methylglycidyl)ether obtainable by reaction of a compound having at least two free alcoholic and/or phenolic hydroxyl groups per molecule with epichlorohydrin or β-methylepichlorohydrin under alkaline conditions or in presence of an acid catalyst with subsequent alkaline treatment.

Suitable starting compounds for the preparation of such glycidyl- or β-methylglycidylethers are for example acyclic alcohols, such as ethylene glycol, diethylene glycol and higher poly(oxyethylene) glycols, propane-1,2-diol and poly(oxypropylene) glycols, propane-1,3-diol, butane-1,4-diol, poly(oxytetramethylene) glycols, pentane-1,5-diol, hexane-1,6-diol, hexane-2,4,6-triol, 1,1,1-trimethylenepropane, pentaerythritol or sorbit, cycloaliphatic alcohols such as resorcitol, quinitol, bis-(4-hydroxycyclohexyl-)-methane, 2,2-bis(4-hydroxycyclohexyl)-propane and alcohols with aromatic cores such as N,N-bis-(2-hydroxyethyl)-aniline and p,p'-bis-(2-hydroxyethylamine)-diphenylmethane.

Further suitable dihydroxy compounds for the preparation of glycidyl- or β-methylglycidylethers are phenols with one core such as resorcin, hydroquinone, phenols with more cores such as bis-(4-hydroxyphenol)-sulfone, 1,1,2,2-tetrakis-(4-hydroxyphenyl)-ethane, 2,2-bis-(4-hydroxyphenyl)-propane (bisphenol A) and 2,2-bis-(3,5-dibromo-4-hydroxyphenyl)-propane as well as novolaks such as phenol- or cresol novolaks.

Polyglycidyl and poly-(β-methylglycidyl)-esters are obtainable by reaction of a compound having bi- or polyvalent carboxylic acid groups per molecule with epichlorohydrin, glycerin dichlorohydrin or β-methylene epichlorohydrin in the presence of alkaline. Such polyglycidylesters may derive from aliphatic polycarboxylic acids such as oxalic acid, succinic acid, glutaric acid, adipic acid, pimelic acid, cork acid, azelaic acid, sebacic acid or dimerized oder trimerized linoleic acid, cycloaliphatic polycarboxylic acids such as tetrahydrophthalic acid, 4-methyltetrahydrophthalic acid, hexahydrophthalic acid and 4-methylhexahydrophthalic acid and other hydrated polycarboxylic acids such as hexahydroisophthalic acid and hexahydroterephthalic acid.

Further suitable epoxies as component (a) are poly-(N-glycidyl) compounds such as for example the products obtainable by dehydrochlorination of the reaction products of epichlorohydrin with amines having at least two amino hydrogen atoms such as aniline, n-butylamine, bis-(4-aminophenyl)-methane and bis-(4-methylaminophenyl)-methane. Also including triglycidyl isocyanurate such as N,N'-diglycidyl derivates of cyclic alkylene urea such as ethylene urea and 1,3-propylene urea and hydantoins such as 5,5-dimethylhydantoin. Also suitable are poly-(S-glycidyl) compounds such as di-S-glycidyl derivatives of dithiols such as ethan-1,2-dithiol and bis-(4-mercaptomethylphenyl)-ether.

Preferably, the compositions contain as component (a) a cycloaliphatic epoxy resin or an epoxidation product of an natural unsaturated oil or a derivative thereof.

The term "cycloaliphatic epoxy resin" within the scope of this invention stands for all epoxy resins with cycloaliphatic structural units, i.e. it comprises both cycloaliphatic glycidyl compounds and β-methylglycidyl compounds as well as epoxy resins based on cycloalkylene oxides.

Suitable cycloaliphatic gycidyl compounds and β-methylglycidyl compounds are the glycidyl esters and β-methylglycidyl esters of cycloaliphatic polycarboxylic acids such as hexahydrophthalic acid, tetrahydrophthalic acid, 4-methyltetrahydrophthalic acid, 3-methylhexahydrophthalic acid and 4-methylhexyhydrophthalic acid.

Further suitable cycloaliphatic epoxy resins are the diglycidyl ethers and β-methylglycidyl ethers of cycloaliphatic alcohols such as 1,2-dihydrocyclohexane, 1,3-dihydrocyclohexane and 1,4-dihydrocyclohexane, 1,4-cyclohexanedimethanol, 1,1-bis(hydroxymethyl)-cyclohex-3-ene, bis-(4-hydroxycyclohexyl)-methane, 2,2-bis-(4-hydroxycyclo-hexyl)-propane and bis-(4-hydroxycyclohexyl)-sulfon.

Examples of epoxy resins with cycloalkylene oxide structures are bis-(2,3-epoxycyclopentyl)-ether, 2,3-epoxycyclopentyl glycidylether, 1,2-bis-(2,3-epoxycyclopentyl)-ethane, vinylcyclohexene oxide, 3,4-epoxycyclohexylmethyl-3',4'-epoxycyclohexane carboxylate, 3,4-epoxy-6-mercaptocyclohexyl-methyl-3',4'-epoxy-6'-methylcyclohexane carboxylate, bis-(3,4-epoxycyclohexylmethyl)-adipate and bis-(3,4-epoxy-6-methylcyclohexylmethyl)-adipate.

Preferred cycloaliphatic epoxy resins are bis-(4-hydroxycyclohexyl)methane-diglycdiylether, 2,2-bis-(4-hydroxycyclohexyl)-propane-diglycidylether, tetrahydrophthalic acid diglycidylester, 4-methyltetrahydrophthalic acid diglycidylester, 4-methylhexyhydrophtahlic acid diglycidylester and in particular hexahydrophthalic acid diglycidylester and 3,4-epoxycyclohexylmethyl-3',4'-epoxycyclohexane carboxylate.

As component (a) epoxidation products of unsaturated fatty acids may be used in the inventive compositions. Preferably, epoxy containing compounds which derive from mono- and poly fatty acids with 12 to 22 C-atoms and a iodine number between 30 and 400, such as lauroleic acid, myristolic acid, palmitoleic acid, oleic acid, gadoleic acid, erucic acid, ricinoleic acid, linoleic acid, linolenic acid, elaidic acid, licanic acid, arachidonic acid and clupanodonic acid are used. Suitable are for example the epoxidation products of soybean oil, linseed oil, perilla oil, tung oil, oiticica oil, safflower oil, poppy oil, hemp oil, cottonseed oil, sunflower oil, colza oil, polyunsaturated triglycerides, triglycerides of euphorbia plants, peanut oil, olive oil, olive kernel oil, almond oil, kapok oil, hazelnut oil, apricot kernel oil, beechnut oil, lupine oil, corn oil, sesame oil, grape-seed oil, lallemantic oil, ricinus oil, herring oil, sardine oil, menhaden oil, whale oil, tall oil and derived derivatives thereof.

Further, higher unsaturated derivatives, which may be obtained by subsequent dehydration reactions of these oils, are suitable.

The olefinic double bonds of the unsaturated fatty acids of the above mentioned compounds may be epoxidized according to known methods, for example by reaction with hydrogen peroxide, if necessary in the presence of a catalyst, an alkylhydro peroxide or a per acid such as performic acid or peracetic acid.

Within the scope of the invention both the completely epoxidized oils and the partially epoxidized derivatives still having free double bonds may be used as component (a).

Particularly preferred as component (a) are epoxidized soy bean oil and epoxidized linseed oil.

By the term antioxidants in the form of component (b1) the sterically hindered amines known under the designation "HALS" are meant. Within the scope of the present invention it has been found that only one special subgroup of these class of compounds is suitable for solving the posed problem, namely compounds of the following formula I:

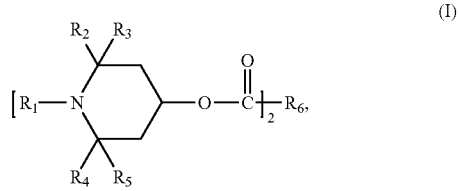

wherein $R_1$=—H, —OH, —O—$C_1$-$C_{18}$-alkyl, —$C_1$-$C_{18}$-alkyl, unsubstituted —$C_5$-$C_{12}$-cycloalkyl or substituted with $C_1$-$C_8$-alkyl or $C_1$-$C_6$-alkoxy or unsubstituted —$CH_2$—$C_5$-$C_{12}$-cycloalkyl or substituted with $C_1$-$C_6$-alkyl or $C_1$-$C_8$-alkoxy;
$R_{2,3,4,5}$=independent from each other —$C_1$-$C_6$-alkyl; and
$R_6$=a bivalent aliphatic, cycloaliphatic or aromatic residue.

Alkyl in the mentioned alkyl- and alkoxy groups means a linear or branched residue with up to 18 C-atoms and comprises, for example, methyl, ethyl, isopropyl, n-propyl, n-butyl, isobutyl, sec.-butyl, tert.-butyl as well as the different isomers of pentyl-, hexyl-, heptyl-, octyl-, nonyl-, decyl-, undecyl-, tridecyl-, tetradecyl-, pentadecyl-, hexadecyl-, heptadecyl-, octadecyl-, nonadecyl- and eicosyl groups.

Examples of cycloalkyl which is optionally substituted with alkyl are cyclopentyl, cyclohexyl, methyl- and ethylcyclohexyl and dimethylcyclohexyl.

Preferred compounds of the general formula I are such wherein $R_1$=—H, —O—$C_1$-$C_{18}$-alkyl, —$C_1$-$C_{18}$-alkyl; $R_{2,3,4,5}$=—$CH_3$; and $R_6$=a bivalent aliphatic —$(CH_2)_n$— residue with n=1-18 or a bivalent residue=$CR_7R_8$, wherein $R_7$ and $R_8$ are independently from each other linear or branched —$C_1$-$C_8$-alkyl or a residue having an aromatic ring.

Particular preferred compounds of the general formula I are such wherein $R_1$=—H, —O—$C_8$-alkyl or —$CH_3$; $R_{2,3,4,5}$=—$CH_3$; and $R_6$=a bivalent aliphatic —$(CH_2)_n$— residue with n=8 or a bivalent residue=$CR_7R_8$, wherein $R_7$=n-butyl and $R_8$=3,5-di-tert.-butyl-4-hydroxybenzyl.

By UV absorbers in the form of component (b2) are meant such compounds having a preferably high extension coefficient in the wavelength region approximately between 280-350 nm as well as a particularly good photochemical stability. Therefore, preferred UV absorbers are such from the class of hydrobenzophenone, in particular such that derive from 2,4-dihydroxybenzophenone of the following general formula II:

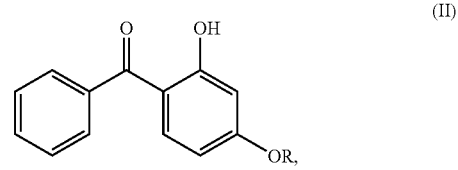

wherein R=—H, linear or branched —$C_{1-12}$ alkyl.

Particular preferred UV absorbers are such from the class of benzotriazole, e.g. of the following general formula III:

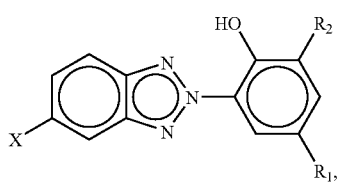

(III)

wherein
X=H, Cl;
$R_1$=—$CH_3$, branched alkyl or branched alkylaryl;
$R_2$=H, branched alkyl or branched alkylaryl.

Some examples of compounds according to the above formula III are:
2-(3-tert.-butyl-2-hydroxy-5-methylphenyl)-2H-benzotriazole,
2-(3,5-di-tert.-butyl-2-hydroxyphenyl)-2H-benzotriazole,
5-Chloro-2-(3,5-di-tert-butyl-2-hydroxyphenyl)-2H-benzotriazole.

Further examples of benzotriazoles with different residues $R_1$ and $R_2$ as defined for the general formula above are e.g. the reaction products of the following reaction of a propionate of the formula V:

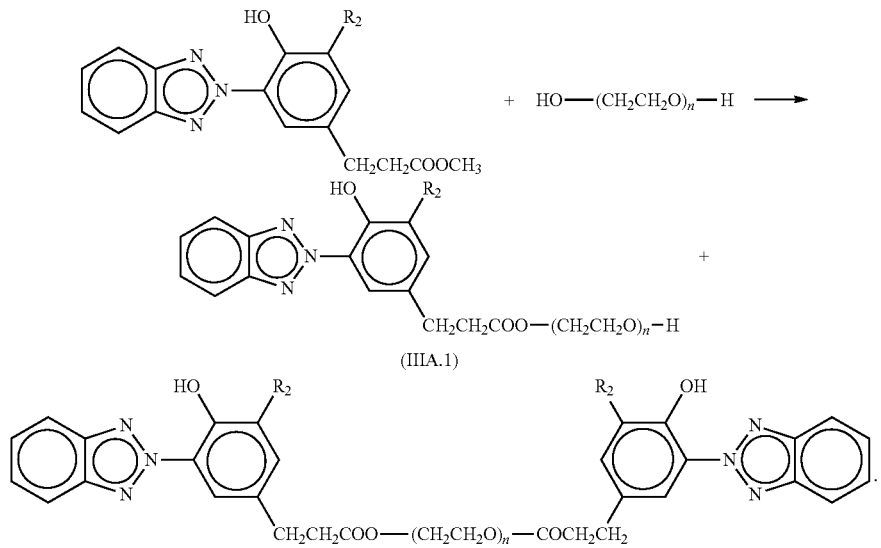

In the reaction of the propionate with the polyethylene glycol the indicated "diester" of the formula IIIA.2 is formed besides the "monoester" of the formula IIIA.1.

As two further examples with other residues $R_1$ and $R_2$ than defined for the general formula III above are also mentioned:
2,2-methylenebis-[6-(2H-benzotriazol-2-yl)-4-(1,1,3,3-tetramethylbutylphenol), 2-(2-Hydroxy-5-methyl-3-(3,4,5,6-tetrahydrophthalimidemethyl)-phenyl)-2H-benzotriazole.

One or more of the compounds of the components (a) and (b1, b2) may be used in the inventive compositions, respectively.

Further, the curable compositions may comprise fillers, adjuvants and additives common in epoxy resin techniques.

Possible fillers are for example: metal powder, wood flour, glass powder, glass beads, semi-metal and metal oxides such as $SiO_2$ (silica sand, silica flour, silanized silica flour, synthetic silica flour, silanized synthetic silica flour). aluminium oxide, titan oxide and zircon oxide, metal hydroxide such as $Mg(OH)_2$, $Al(OH)_3$, silanized $Al(OH)_3$ and AlO(OH), semi-metal and metal carbides (SiC and boron carbide), metal carbonates (dolomite, chalk, $CaCO_3$), metal sulfides (barite, gypsum), rock flour such as from hydromagnesite and huntite and natural or synthetic minerals mainly from the silicate row such as zeolites (in particular molecular sieves), talc, mica, kaloin, wollastonite and others. Preferred fillers are silica flour, silanized silica flour, aluminium hydroxide or aluminium oxide. Particular preferred is silanized silica flour. The possible amounts of the fillers are between from 0 to 80, preferably 55-70, particular preferred 60-67 wt % based on the total mixture including the curing agents.

Besides the above mentioned fillers the curable mixtures may contain further common adjuvants and additives such as antioxidants, which do not correspond to the compounds of the general formula I, e.g. sterically hindered phenols, flame retardants, fillers containing crystal water, diluents, colorants, pigments, fungicides, thixotropic and hydrophobic agents, viscosity enhancers, anti-foaming agents, antistatica, lubricants, anti-precipitation agents, wetting agents, flexibilizers, diluter and demoulding agents.

In principle, the inventive compositions may be cured by cationic polymerisation of the epoxy resin systems with an initiator system or by polyaddition with a polycarboxylic acid anhydride.

Thereby, it may concern linear aliphatic polymeric anhydrides such as polysebacic acid anhydride or polyazelaic acid anhydride or cyclic carboxylic acid anhydrides.

Cyclic carboxylic acid anhydrides are particularly preferred.

Examples for cyclic carboxylic acid anhydrides are
Succinic acid anhydride, citrocon acid anhydride, itacon acid anhydride, alkenyl-substituted succinic acid anhydrides, dodecenyisuccinic acid anhydride, maleic acid anhydride and tricarballyl acid anhydride, maleic acid anhydride adducts of cyclopentadiene or methylcyclopentadiene, linoleic acid adducts of maleic acid anhydride, wherein from both in the latter case the isomeric mixtures are particular suitable. Particular preferred are hexahydrophthalic acid anhydride and methylhexahydrophthalic acid anhydride.

Further examples of cyclic carboxylic acid anhydrides are aromatic anhydrides such as pyromellitic acid anhydride, trimellitic acid anhydride and phthalic acid anhydride.

Also, chlorinated or brominated anhydrides such as tetrachlorohexahydrophthalic acid anhydride, tetrabromohexahydrophthalic acid anhydride, dichloromaleic acid anhydride and chlorendic acid anhydride may be used.

If necessary, the inventive compositions may comprise additionally a curing accelerator. Suitable accelerators are known to the man skilled in the art. As examples are mentioned:
Complexes of amines, in particular tertiary amines, with boron trichloride or boron trifluoride;
tertiary amines such as benzyldimethylamine;
urea derivatives such as N-4-chlorophenyl-N',N'-dimethylurea (monuron);
optionally substituted imidazoles such as imidazole, 2-methylimidazole, 2-ethyl-4-methylimidazole or 2-phenylimidazole.

Preferred accelerators are tertiary amines, in particular benzyldimethylamine and imidazoles (e.g. 1-methylimidazole) for the above mentioned compositions containing epoxidized oils.

The curing agents and optional accelerators are used in the commonly effective amounts, i.e. sufficient for the curing of the inventive compositions. The ratio of resin to curing agent depends on the type of used compounds, the necessary curing rate and the desired properties of the final product and may be easily determined by the skilled man in the art. In general, 0.4 to 1.6, preferably 0.8 to 1.2 equivalents of anhydride groups per epoxy equivalent are used.

As initiator system for the cationic polymerisation of epoxy resins for example thermal activatable initiators such as thermal activatable onium salts, oxonium salts, iodonium salts, sulfonium salts, phosphonium salts or quaternary ammonium salts having no nucelophilic anions are used. Such initiators and their application are known. For example, in U.S. Pat. No. 4,336,363, EP-A-0 379 464 and EP-A-0 580 552 specific sulfonium salts as curing agents are disclosed as epoxy resins. In U.S. Pat. No. 4,058,401 the respective tellurium and selenium salts are describes besides the specific sulfonium salts.

For example, quaternary ammonium salts as thermal activatable initiators are disclosed in EP-A-0 066 543 and EP-A-0 673 104. They are salts of aromatic heterocyclic nitrogen bases with non-nucleophilic, for example complex, halide anions such as $BF_4^-$, $PF_6^-$, $SbF_6^-$, $SbF_5(OH)^-$ and $AsF_6^-$.

Particular preferred N-benzylquinoliniumhexafluoro antimonate is used as quaternary ammonium salt.

Additionally, it is appropriate to use a thermal radical former such as pinacols and their ethers, esters or silyl derivatives in the use of quaternary ammonium salts. These compounds are known and may be prepared by known processes.

Preferably, the pinacols such as acetophenone pinacol or in particular 1,1,2,2-tetraphenyl-1,2-ethandiol (benzopinacol) are used as thermal radical formers.

In particular, N-benzylquionliniumhexafluoro antimonate together with 1,1,2,2-tetraphenyl-1,2-ethandiol, preferably in a molar ration of about 1:1, is used as thermal activatable initiator.

In general, the activation temperature of the cationic initiator is above room temperature, preferably in the range between 60 to 180° C., in particular between 90 to 150° C.

In general, the amount of the cationic initiator comprised in the cationic curable epoxy resin is 0.05 to 30 wt %, preferably 0.5 to 15 wt %, based on the amount of the cationic polymerizable epoxy resin.

The inventive compositions may be prepared by known methods by means of mix aggregates such as stirrers (in particular dispersers and Supraton® with high shear gradient), kneaders, mills or dry blenders. In the case of epoxy resins the dispergation can be made in the melt.

The curing of the inventive compositions may be made by known manner in one or multiple stages. It takes place, in general, by heating the mixture to temperatures between 60° C. and 200° C., in particular between 80° C. and 180° C.

Further, object of the invention is the cross-linked products obtainable by curing the inventive compositions.

Surprisingly, the addition of the specific antioxidant, optionally in combination with an UV absorber, leads to a totally improved weather resistance and decreased discharge current of a cured inventive composition. By weather resistance the long term stability especially against UV light, climatic change of heat/coldness and wetness/dryness, erosion rate (weight loss) and the increase of roughness over a long period is meant. The advantage of the improved weather resistance is the higher life span of isolators prepared from the inventive compositions. By the minor increase of roughness, the reliability of such isolators is improved because those have a lower flashover possibility. Over it, the discharge currents over the isolators are lowered by these additions expressing an additionally huge advantage. Further, it has the advantage that such isolators are looking "new" much longer.

In particular, the inventive compositions are suitable as casting resins, casting materials ("structural casting"), lamination resins, moulding materials ("epoxy moulding compounds"), coating materials as well as in particular as electrical insulation materials.

The use of the inventive compositions as electrical insulation material is a further object of the invention.

In the following examples the following commercially available substances are used:

| | |
|---|---|
| epoxy resin | liquid hexahydrophthalic acid diglycidylester; epoxy content: 5.6 to 6.2 val/kg ("Araldit ® CY 184", Huntsman); |
| curing agent | curing mixture of 70 parts by weight hexahydrophthalic acid anhiydride and 30 parts by weight methylhexahydrophthalic acid anhydride; |
| BDMA | benzyldimethylamine; |
| W 12 EST | silica flour pretreated with epoxy silane (Quarzwerke Frechen); |
| Tinuvin ® | antioxidants and UV absorbers, all from Ciba Speciality Chemicals; |
| Tinuvin 571 | benzotriazole of the formula III, wherein X = H, $R_1$ = —$CH_3$, $R_2$ = $C_{12}H_{25}$; |
| Tinuvin 1130 | mixture of benzotriazoles of the formula IIIA.1 and IIIA.2; |
| Tinuvin 791 | mixture of 50% Chimasorb ® 944 and 50% Tinuvin 770; |
| Tinuvin B75 | mixture of 20% Irganox 1135, 40% Tinuvin 765, 40% Tinuvin 571 |
| Tinuvin 123 | HALS of the formula I, wherein $R_1$ = —O—$C_8H_{17}$, $R_{2,3,4,5}$ = —$CH_3$, $R_6$ = —$(CH_2)_6$—; |
| Tinuvin 144 | HALS of the formula I, wherein $R_1$ = —$CH_3$, $R_{2,3,4,5}$ = —$CH_3$, $R_6$ = =$CR_7R_8$, wherein $R_7$ = n-butyl, $R_8$ = 3,5-di-tert.-butyl-4-hydroxybenzyl; |
| Tinuvin 765 | HALS of the formula I, wherein $R_1$ = —$CH_3$, $R_{2,3,4,5}$ = —$CH_3$, $R_6$ = —$(CH_2)_8$—; |
| Tinuvin 770 | HALS of the formula I, wherein $R_1$ = —H, $R_{2,3,4,5}$ = —$CH_3$, $R_6$ = —$(CH_2)_8$—; |

Chimasorb ® 944 HALS, which can not be described by formula I:

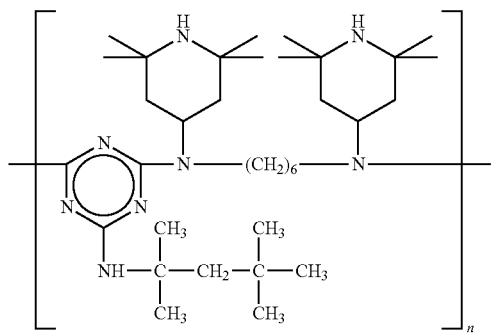

Irganox ® 1135 compound of the formula

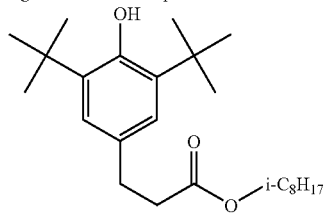

PREPARATION EXAMPLES

Comparative Example 1

=Pre-Mixture 1

An unmodified resin serves as reference: Araldit CY 184 ex Huntsman

Comparative Example 2

=Pre-Mixture 2

100 g Araldit CY 184 and 2 g Tinuvin 571 are weighed and mixed under stirring for 5 minutes at room temperature.

Comparative Example 3

=Pre-Mixture 3

100 g Araldit CY 184 and 2 g Tinuvin 791 are weighed and heated under stirring to 60-65° C. until all of the solid has been dissolved.

Inventive Example 1

=Pre-Mixture 4

100 g Araldit CY 184 and 2 g Tinuvin B75 are weighed and mixed under stirring for 5 minutes at room temperature.

Inventive Example 2

=Pre-Mixture 5

100 g Araldit CY 184 and 0.8 g Tinuvin 144 and 1.2 g Tinuvin 1130 are weighed and heated under stirring to 65-70° C. until all of the solid has been dissolved.

Inventive Example 3

=Pre-Mixture 6

100 g Araldit CY 184 and 0.8 g Tinuvin 123 and 1.2 g Tinuvin 1130 are weighed and mixed under stirring for 5 minutes at room temperature.

Inventive Example 4

=Pre-Mixture 7

100 g Araldit CY 184 and 2 g Tinuvin 765 are weighed and mixed under stirring for 5 minutes at room temperature.

Inventive Example 5

=Pre-Mixture 8

100 g Araldit CY 184 and 2 g Tinuvin 770 are weighed and heated under stirring to 50-55° C. until all of the solid have been dissolved.

Preparation of the Test Specimen from the Pre-Mixtures:
Preparation of Test Specimen 1=Plate 1 from Pre-Mixture 1:

100 g Araldit CY 184 of the pre-mixture 1 are mixed with 90 g curing agent and 0.5 g benzyldimethylamine and stirred. While the temperature is increased with a hot plate under stirring, 353.9 g silica flour is added in portions. The mixture is stirred and heated until a temperature of 80° C. is reached. Subsequently, a vacuum of 4 mbar is applied and degasification is performed until the foam, which builds at the beginning, is collapsed. Subsequently, the material is poured into hot moulds of 80° C. for the preparation of 4 mm thick plates, which previously had been treated with releasing agent QZ13 ex Huntsman. Then, the moulds are heated in an oven, first for 6 hours at 80° C., then for 10 hours at 140° C. Subsequently, the mould is taken from the oven and opened as soon as it has cooled down and plate no. 1 is removed.

Preparation of Test Specimen 2-8=Plates 2-8 from Pre-Mixtures 2-8:

102 g pre-mixture 4 is mixed with 90 g curing agent and 0.5 g benzyldimethylamine and stirred. While the temperature is increased with a hot plate under stirring, 357.5 g silica flour is added in portions. The mixture is stirred and heated until a temperature of 80° C. is reached. Subsequently, a vacuum of 4 mbar is applied and degasification is performed until the foam, which builds at the beginning, is collapsed. Subsequently, the material is poured into hot moulds of 80° C. for the preparation of 4 mm thick plates, which previously had been treated with releasing agent QZ13 ex Huntsman. Then, the moulds are heated in an oven, first for 6 hours at 80° C., then for 10 hours at 140° C. Subsequently, the mould is taken from 1:5 the oven and opened as soon as it has cooled down and plate no. 4 is removed.

The preparation of the other test specimen is carried out by the exactly same procedure, based on the pre-mixtures 2, 3, 5-8 instead of pre-mixture 4, whereby the respective plates no. 2, 3, 5-8 are obtained.

Test Procedure

The plates 1-8 are exposed to a modified "exposure mode 2" in an apparatus for artificial accelerated weathering according to ISO 4892-3:1994. In this context, "modified" means that the wet-phase is aggravated tempered at 50° C. instead of 20° C. (as given in the norm).

The sample specimen is exposed to the following cycle under an steady intensive UV radiation:

5 hours dry (rel. Humidity=r.h.<10%) at 50° C. and 1 hour with raining at 50° C.

In the examples, an apparatus of the type "UV200SB/20DU-S" from Fa. Weiss-Technik, Germany, has been used. Compared to the normal sun spectrum standardised according to CIE D65, the used radiation source provides an UV radiation with a factor 4.3 higher, whereby the test is accelerated.

The emitted dose is measured permanently, as the UV intensity of the lamp may change during the measurement. The roughness and weight change (in % compared to the initial value), respectively, is plotted as function of the measured dose of UV radiation expressing the dose as respective necessary radiation length with a "normal sun" according to CIE D65.

The investigation of the surface is carried out approx. Every 1000 normal sunshine hours by determination of the average roughness by means of "Pertho-Meter" (optical instrument for scanning the surface of the sample with a laser, wavelength 800 nm, focus: 1 μm). The weight of the sample specimen is determined with a scale every 1000 normal sunshine hours.

Prior to every roughness measurement the samples are conditioned for two days at 23° C./50% r.h.

The quantitative parts of the compositions are illustrated in Table 1:

TABLE 1

| plate | 1 | 2 | 3 | 4 | 5 | 6 | 7 | 8 |
|---|---|---|---|---|---|---|---|---|
| Resin | 100.00 | 100.00 | 100.00 | 100.00 | 100.00 | 100.00 | 100.00 | 100.00 |
| Curing agent | 90.00 | 90.00 | 90.00 | 90.00 | 90.00 | 90.00 | 90.00 | 90.00 |
| BDMA | 0.50 | 0.50 | 0.50 | 0.50 | 0.50 | 0.50 | 0.50 | 0.50 |
| Silica[1] | 353.86 | 357.50 | 357.50 | 357.50 | 357.50 | 357.50 | 357.50 | 357.50 |
| Tinuvin: | | | | | | | | |
| B75 | | | | 2 | | | | |
| 144 | | | | | 0.8 | | | |
| 123 | | | | | | 0.8 | | |
| 571 | | 2 | | | | | | |
| 765 | | | | | | | 2 | |
| 791 | | | 2 | | | | | |
| 1130 | | | | | 1.2 | 1.2 | | |
| 770 | | | | | | | | 2 |

[1] = rate of filling: 65%

The result of a measurement with respect to the roughness values as function of the weathering duration are summarized in Table 2:

TABLE 2

| | Average roughness in μm plate | | | | | | | |
|---|---|---|---|---|---|---|---|---|
| Time[2] | 1 | 2 | 3 | 4 | 5 | 6 | 7 | 8 |
| 0 | 0.72 | 0.72 | 0.64 | 0.73 | 0.61 | 0.73 | 0.69 | 0.66 |
| 1028 | 0.73 | 0.76 | 0.69 | 0.63 | 0.73 | 0.64 | 0.63 | 0.63 |
| 2042 | 0.79 | 0.72 | 0.63 | 0.61 | 0.70 | 0.63 | 0.64 | 0.63 |
| 2992 | 0.96 | 0.69 | 0.60 | 0.58 | 0.69 | 0.60 | 0.66 | 0.70 |
| 3971 | 1.17 | 0.98 | 1.05 | 0.64 | 0.73 | 0.56 | 0.61 | 0.69 |
| 4947 | 1.28 | 1.43 | 1.39 | 0.66 | 0.72 | .069 | 0.67 | 0.72 |
| 5893 | 1.34 | 1.30 | 1.66 | 0.64 | 0.72 | 0.72 | 0.64 | 0.67 |
| 6852 | 1.68 | 1.28 | 1.69 | 0.73 | 0.78 | 0.75 | 0.72 | 0.66 |
| 7967 | 2.38 | 1.48 | 2.69 | 0.70 | 0.81 | 0.79 | 0.73 | 0.73 |
| 9008 | 2.70 | 1.71 | 2.61 | 0.73 | 0.81 | 0.79 | 0.81 | 0.85 |
| 10024 | 3.25 | 2.11 | 3.28 | 0.78 | 0.81 | 0.87 | 1.27 | 1.04 |
| 10899 | 3.04 | 2.11 | 3.28 | 0.84 | 0.92 | 1.51 | 1.27 | 1.04 |
| 11861 | 3.49 | 2.47 | 3.56 | 0.92 | 1.08 | 1.17 | 1.36 | 1.16 |
| 12841 | 3.91 | 2.56 | 3.46 | 1.04 | 1.16 | 1.33 | 1.89 | 1.43 |
| 13806 | 4.00 | 2.94 | 4.33 | 1.04 | 1.16 | 1.33 | 2.43 | 1.43 |
| 14787 | 3.77 | 3.37 | 4.33 | 1.75 | 1.66 | 2.09 | 2.79 | 2.26 |
| 15753 | 4.49 | 3.83 | 4.99 | 1.92 | 2.06 | 2.37 | 2.88 | 2.78 |
| 16727 | 5.14 | 3.78 | 4.29 | 2.35 | 2.43 | 2.64 | 3.23 | 3.22 |
| 17639 | 4.17 | 4.03 | 5.04 | 2.69 | 2.58 | 3.10 | 3.72 | 3.45 |
| 18644 | 4.70 | 4.46 | 4.84 | 2.70 | 2.90 | 3.89 | 3.89 | 3.75 |

[2] time of treatment in normal sunshine hours

The measured weight changes of the test specimen as function of weathering duration are listed in Table 3:

TABLE 3

| | material changes in % vis-à-vis the initial value plate | | | | | | | |
|---|---|---|---|---|---|---|---|---|
| Time[2] | 1 | 2 | 3 | 4 | 5 | 6 | 7 | 8 |
| 0 | 0.00 | 0.00 | 0.00 | 0.00 | 0.00 | 0.00 | 0.00 | 0.00 |
| 1028 | 0.07 | 0.10 | 0.13 | 0.10 | 0.08 | 0.08 | 0.12 | 0.14 |
| 2042 | 0.09 | 0.13 | 0.17 | 0.13 | 0.11 | 0.11 | 0.14 | 0.17 |
| 2992 | 0.07 | 0.14 | 0.16 | 0.13 | 0.11 | 0.11 | 0.15 | 0.17 |
| 3971 | 0.05 | 0.11 | 0.12 | 0.12 | 0.10 | 0.09 | 0.13 | 0.15 |
| 4947 | −0.01 | 0.10 | 0.07 | 0.11 | 0.12 | 0.09 | 0.12 | 0.13 |
| 5893 | −0.08 | 0.06 | 0.03 | 0.10 | 0.10 | 0.08 | 0.12 | 0.11 |
| 6852 | −0.16 | 0.00 | −0.07 | 0.08 | 0.06 | 0.04 | 0.06 | 0.05 |
| 7967 | −0.22 | −0.01 | −0.12 | 0.10 | 0.07 | 0.05 | 0.06 | 0.06 |
| 9008 | −0.36 | −0.09 | −0.26 | 0.04 | 0.01 | −0.01 | −0.01 | −0.01 |
| 10024 | −0.47 | −0.14 | −0.33 | 0.02 | −0.01 | −0.04 | −0.04 | −0.05 |
| 10899 | −0.57 | −0.19 | −0.44 | −0.01 | −0.04 | −0.07 | −0.08 | −0.08 |
| 11861 | −0.63 | −0.23 | −0.51 | −0.01 | −0.05 | −0.09 | −0.11 | −0.08 |
| 12841 | −0.73 | −0.27 | −0.62 | −0.03 | −0.08 | −0.11 | −0.19 | −0.13 |
| 13806 | −0.82 | −0.33 | −0.74 | −0.07 | −0.13 | −0.17 | −0.26 | −0.21 |
| 14787 | −0.91 | −0.36 | −0.85 | −0.10 | −0.14 | −0.21 | −0.31 | −0.25 |
| 15753 | −1.08 | −0.44 | −1.05 | −0.17 | −0.21 | −0.28 | −0.42 | −0.34 |
| 16727 | −1.19 | −0.51 | −1.16 | −0.23 | −0.28 | −0.35 | −0.51 | −0.43 |
| 17639 | −1.34 | −0.61 | −1.28 | −0.30 | −0.36 | −0.44 | −0.62 | −0.53 |
| 18644 | −1.47 | −0.71 | −1.43 | −0.36 | −0.41 | −0.53 | −0.69 | −0.61 |

Appraisal of Results:

Comparative example 1 (plate 1)—the unmodified comparative system—shows a distinct increase of roughness after comparatively short treatment time, already. After 18644 hours ageing time the roughness Ra has increased from 0.72 µm to 4.7 µm and a weight loss of 1.47% has occurred.

The approach to improve the behaviour in this test by addition of an UV absorber (comparative example 2) actually shows an improvement with respect to weight loss, but has no significant influence on the development of roughness and thus, is no solution of the problem.

The addition of 2% Tinuvin 791 (comparative example 3) leads to no significant effect on the roughness or the weight loss. Tinuvin 791 contains up to 50% Tinuvin 770, which is subject to the claimed structural restriction, while the remaining 50% are Chimasorb 944, which is not subject to the claimed structural restriction.

In comparison of comparative example 3 with the inventive example 5 comprising 100% an inventive HALS compound and bringing about good effects (minor increase of roughness and minor weight loss), it has been shown that there is no linear relationship of effectiveness of the additives to their concentration which has not been predictable and thus, is surprising.

Inventive example 4 comprises a HALS according to the claimed structural and concentration limits and leads to good results (minor increase of roughness and minor weight loss).

The inventive example 1, 2, 3 are proof for the surprisingly better efficiency of HALS compounds according to formula 1 over the inventive examples 4 or 5 in the claimed limits, if these are used together with an UV absorber. Thus, it is possible, to better stabilize cycloaliphatic epoxy resins. The best results are obtained with the additions according to example 1, i.e. an increase of roughness to only 2.7 µm and a weight loss of only 0.36% by exposure to 18644 normal sunshine hours.

The invention claimed is:

1. A curable epoxy resin composition consisting of
   (a) an epoxy resin, wherein the epoxy resin consists of at least one epoxidation product of a natural unsaturated oil or a derivative thereof;
   (b) a combination of an antioxidant (b1) and an UV absorber (b2) comprising a benzotriazole component, characterized in that the antioxidant (b1) is a compound of the general formula (I)

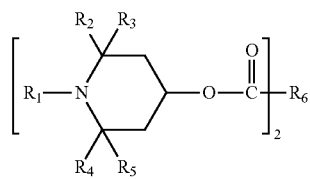

(I)

wherein $R_1$=—H, —OH, —O—$C_{1-18}$ alkyl, —$C_{1-18}$ alkyl, —$C_{5-12}$ cycloalkyl being unsubstituted or being substituted with $C_{1-6}$ alkyl or $C_{1-6}$ alkoxy, or —$CH_2$—$C_{5-12}$ cycloalkyl being unsubstituted or substituted with $C_{1-6}$ alkyl or $C_{1-6}$ alkoxy;
$R_{2,3,4,5}$=independent from each other —$C_{1-6}$ alkyl; and
$R_6$=a bivalent aliphatic, cycloaliphatic or aromatic residue, and
wherein the weight ratio between components (a) and (b) is from 90.0:10.0 to 98.5:1.5, with the proviso that the weight portion of the component (b1) is at least 0.5;

and optionally:
   (c) a curing agent or initiator system;
   (d) a filler selected from metal powder, wood flour, glass powder, glass beads, semi-metal oxide, metal oxide, metal hydroxide, semi-metal carbide, metal carbide, metal carbonate, metal sulfide, rock flour, zeolite, talc, mica, kaolin, wollastonite, and mixture thereof; and
   (e) an additive selected from a flame retardant, sterically hindered phenol, diluent, colorant, pigment, fungicide, curing accelerator, thixotropic agent, hydrophobic agent, antistatic, lubricant, anti-precipitation agent, wetting agent, demoulding agent and mixture thereof.

2. A composition according to claim 1 containing components (a) and (b) in a weight ratio of from 95.0:5.0 to 98.5:1.5.

3. A composition according to claim 1 containing components (a) and (b) in a weight ratio of from 97.0:3.0 to 98.5:1.5.

4. A composition according to claim 1 containing a compound of the general formula (I) wherein $R_1$=—H, —O—$C_{1-18}$ alkyl, or —$C_{1-18}$ alkyl; $R_{2,3,4,5}$=$CH_3$; and $R_6$=a bivalent aliphatic —$(CH_2)_n$— residue with n=1-18 or a bivalent residue=$CR_7R_8$, wherein $R_7$ and $R_8$ are independently from each other linear or branched —$C_{1-8}$ alkyl or a residue having an aromatic ring.

5. A composition according to claim 4 containing a compound of the general formula (I), wherein $R_1$=—H, —O—$C_8$ alkyl, or —$CH_3$; $R_{2,3,4,5}$=$CH_3$; and $R_6$=a bivalent aliphatic —$(CH_2)_n$— residue with n=8 or a bivalent residue=$CR_7R_8$, wherein $R_7$=n-butyl and $R_8$=3,5-di-tert-butyl-4-hydroxybenzyl.

6. A composition according to claim 1 additionally containing a curing agent.

7. A composition according to claim 6 containing a polycarboxylic acid anhydride as curing agent.

8. A method of producing a cross-linked product comprising curing a composition consisting of
   (a) an epoxy resin, wherein the epoxy resin consists of at least one epoxidation product of a natural unsaturated oil or a derivative thereof;
   (b) a combination of an antioxidant (b1) and an UV absorber (b2) comprising a benzotriazole component, characterized in that the antioxidant (b1) is a compound of the general formula (I)

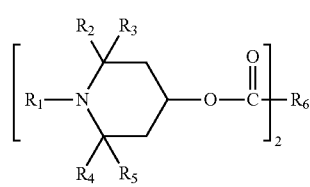

(I)

wherein $R_1$=—H, —OH, —O—$C_{1-18}$ alkyl, —$C_{1-18}$ alkyl, —$C_{5-12}$ cycloalkyl being unsubstituted or being substituted with $C_{1-6}$ alkyl or $C_{1-6}$ alkoxy, or —$CH_2$—$C_{5-12}$ cycloalkyl being unsubstituted or substituted with $C_{1-6}$ alkyl or $C_{1-6}$ alkoxy;
$R_{2,3,4,5}$=independent from each other —$C_{1-6}$ alkyl; and
$R_6$=a bivalent aliphatic, cycloaliphatic or aromatic residue, and
wherein the weight ratio between components (a) and (b) is from 90.0:10.0 to 98.5:1.5, with the proviso that the weight portion of the component (b1) is at least 0.5;

(c) a curing agent or initiator system;
and optionally:
(d) a filler selected from metal powder, wood flour, glass powder, glass beads, semi-metal oxide, metal oxide, metal hydroxide, semi-metal carbide, metal carbide, metal carbonate, metal sulfide, rock flour, zeolite, talc, mica, kaolin, wollastonite, and mixture thereof; and
(e) an additive selected from a flame retardant, sterically hindered phenol, diluent, colorant, pigment, fungicide, curing accelerator, thixotropic agent, hydrophobic agent, antistatic, lubricant, anti-precipitation agent, wetting agent, demoulding agent and mixture thereof.

9. An electrical insulation material obtained by curing a composition consisting of
(a) an epoxy resin, wherein the epoxy resin consists of at least one epoxidation product of a natural unsaturated oil or a derivative thereof;
(b) a combination of an antioxidant (b1) and an UV absorber (b2) comprising a benzotriazole component, characterized in that the antioxidant (b1) is a compound of the general formula (I)

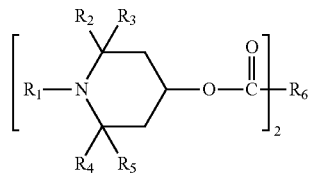
(I)

wherein $R_1$=—H, —OH, —O—$C_{1-18}$ alkyl, —$C_{1-18}$ alkyl, —$C_{5-12}$ cycloalkyl being unsubstituted or being substituted with $C_{1-6}$ alkyl or $C_{1-6}$ alkoxy, or —$CH_2$—$C_{5-12}$ cycloalkyl being unsubstituted or substituted with $C_{1-6}$ alkyl or $C_{1-6}$ alkoxy;

$R_{2,3,4,5}$=independent from each other —$C_{1-6}$ alkyl; and $R_6$=a bivalent aliphatic, cycloaliphatic or aromatic residue, and wherein the weight ratio between components (a) and (b) is from 90.0:10.0 to 98.5:1.5, with the proviso that the weight portion of the component (b1) is at least 0.5;

(c) a curing agent or initiator system;

and optionally:

(d) a filler selected from metal powder, wood flour, glass powder, glass beads, semi-metal oxide, metal oxide, metal hydroxide, semi-metal carbide, metal carbide, metal carbonate, metal sulfide, rock flour, zeolite, talc, mica, kaolin, wollastonite, and mixture thereof; and (e) an additive selected from a flame retardant, sterically hindered phenol, diluent, colorant, pigment, fungicide, curing accelerator, thixotropic agent, hydrophobic agent, antistatic, lubricant, anti-precipitation agent, wetting agent, demoulding agent and mixture thereof.

* * * * *